United States Patent [19]

Maeda

[11] Patent Number: 5,450,619
[45] Date of Patent: Sep. 12, 1995

[54] SLIDABLY RETRACTABLE PORTABLE TELEPHONE APPARATUS

[75] Inventor: Koji Maeda, Tokyo, Japan

[73] Assignee: NEC Corporation, Japan

[21] Appl. No.: 49,530

[22] Filed: Apr. 20, 1993

[30] Foreign Application Priority Data

Apr. 21, 1992 [JP] Japan .................................. 4-100094

[51] Int. Cl.6 .......................... H04B 1/38; H04B 1/08
[52] U.S. Cl. ...................................... 455/89; 455/90;
455/348; 455/351; 379/433; 379/440
[58] Field of Search ............. 455/39, 90, 154.1, 158.4,
455/344, 348, 349, 350, 351; 379/58, 59, 431,
433, 440, 446, 110

[56] References Cited

U.S. PATENT DOCUMENTS

| 4,845,772 | 7/1989 | Metroka et al. | 455/90 |
| 5,109,539 | 4/1992 | Inubushi et al. | 379/433 |
| 5,151,946 | 9/1992 | Martensson | 379/433 |
| 5,189,632 | 2/1993 | Paajanen et al. | 379/110 |

FOREIGN PATENT DOCUMENTS

| 0535903 | 4/1993 | European Pat. Off. | 455/89 |
| 0038149 | 2/1991 | Japan | 379/433 |
| 3234126 | 10/1991 | Japan | 455/89 |
| 4298125 | 10/1992 | Japan | 455/89 |

OTHER PUBLICATIONS

"Micro-Tac Telephone"; Motorola; 1992; pp. 1-4.

Primary Examiner—Edward F. Urban
Assistant Examiner—Andrew Faile
Attorney, Agent, or Firm—Ostrolenk, Faber, Gerb & Soffen

[57] ABSTRACT

In a portable telephone apparatus, the length of a housing thereof and a display area are altered between the operation and storage or non-operation states thereof, thereby improving operability thereof. In the operating state, the first display and the second display are activated to present information. In the non-operation state, only the first display is activated. In the storage state, to minimize the size of the housing, only the indispensable information items such as the remaining battery power and in-service-area designation are presented, thereby facilitating the apparatus to be accommodated in a small space. In the operation state, the housing is elongated such that the distance between the transmitter and the receiver is similar to that between the mouth and the ear of the user to improve the speech quality in the telephone call. Moreover, the display area is increased to possibly present a dial number inputted.

6 Claims, 5 Drawing Sheets

SLIDABLY RETRACTABLE PORTABLE TELEPHONE APPARATUS

BACKGROUND OF THE INVENTION

The present invention relates to a portable telephone apparatus, and in particular, to a portable telephone apparatus having a display function.

DESCRIPTION OF THE RELATED ART

According to production trends of portable telephone facilities and apparatuses, it can be considered that the weight and the size thereof will be much more reduced.

Conventionally, a portable telephone set includes a radio section as communicating means, a voice transmitting section (microphone) and a voice receiving section (receiver) which achieve a signal transformation between voice and electronic signals, and a keyboard section to input therefrom dial numbers and the like.

Moreover, recently, there has been materialized a telephone device including so as to achieve a function to present, for example, a dial number inputted from the keyboard unit.

In the telephone device of the prior art, the distance between the transmitter or microphone and the receiver is determined under a limiting condition of the distance between the positions respectively of the mouth and the ear of the user. Consequently, in the operation state of the telephone apparatus, there is necessitated a certain vertical length of about 15 to about 20 centimeters (cm). On the other hand, in the wait state in which the telephone is kept or stored in so-called a housing thereof, the length thereof in the operating state is inconveniently long. In consequence, there has been introduced a structure thereof to minimize the length in the storage state. However, in consideration of human engineering, the keyboard unit is operated by a human operator and hence requires an appropriate size thereof for operations. Similarly, the display necessitates a certain proper size for the operator to easily recognize items presented thereon. In consequence, in the structure in which the length of the telephone apparatus is reduced in the wait or storage state thereof, it is necessary, for example, to minimize the size of the display in its original form.

SUMMARY OF THE INVENTION

It is therefore an object of the present invention to provide a telephone apparatus of which the length can be changed between the operation and storage states and which can display minimum indispensable information in the storage state.

In accordance with the present invention, there is provided a telephone apparatus comprising a first casing including a first display section for achieving a necessary display operation in a storage state of the apparatus and a second display section for conducting a display operation of information cotaining a dial number in an operation state thereof, a second casing slidably connected to the first casing, and detecting means for detecting the operation and storage states of the apparatus. Thanks to the sliding of the second casing, the length of the apparatus can be changed between the operation and storage states. In the storage state, the second display section is concealed by the second casing and does not accomplish the display operation according to an output from the detecting means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1A:
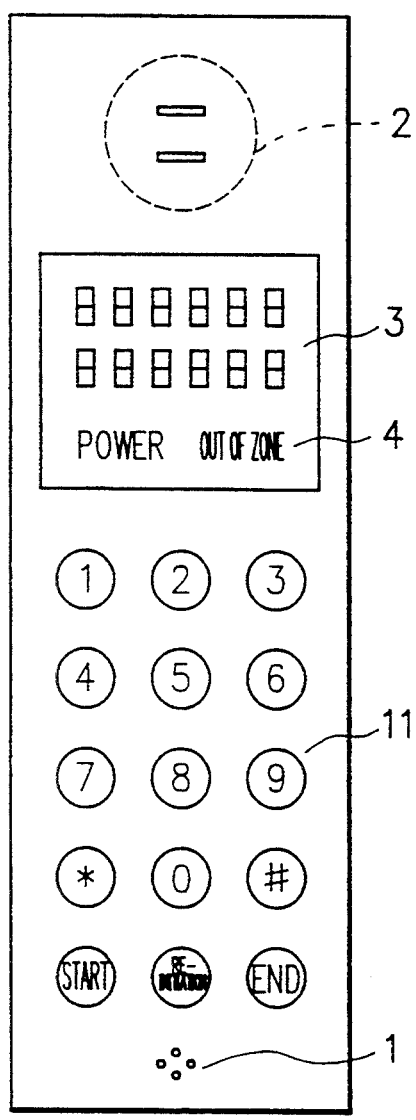
FIGS. 1A and 1B are diagrams showing appearances of an upper surface of a portable telephone set in an embodiment in accordance with the present invention.
Figure 1B:
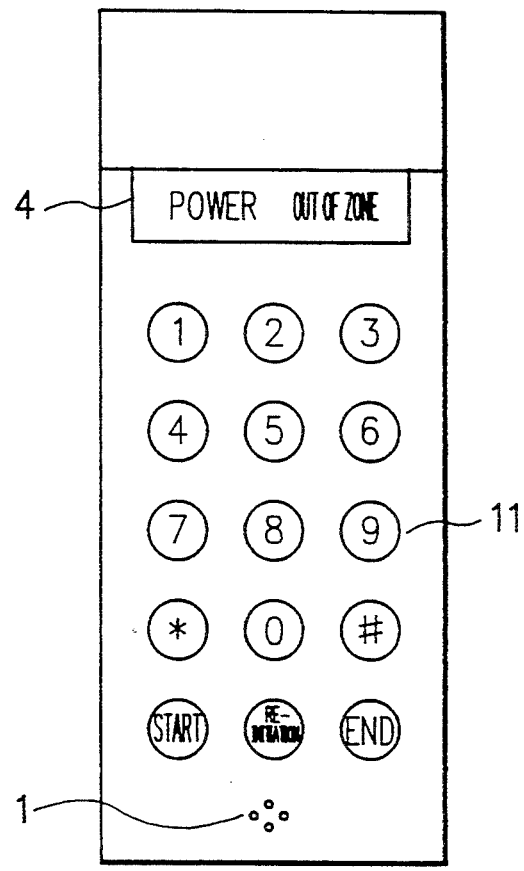

Referring now to the drawings, description will be given of an embodiment in accordance with the present invention. FIGS. 1A and 1B show appearances of a front surface of a slideably retractive portable telephone apparatus respectively in the extended operational (FIG. 1A) and retracted storage (FIG. 1B) states in an embodiment in accordance with the present invention.

The apparatus of this embodiment adopts a radio communication as communicating means. Consequently, it is indispensable for the apparatus to have a function display to notify the user in the actual operation whether or not the apparatus is in a service area where the communication radio wave can be received. Furthermore, it is also necessary to possess a function of presenting the user whether or not a battery of the apparatus has a sufficient remaining power.

The telephone set includes a display 4 as shown in FIG. 1B. The display 4 conducts the required operation, namely, function display. More concretely, in the display 4, presentation of "Power" is turned off when the apparatus is not being supplied with power. The display is turned on when the apparatus is being powered and the remaining capacity of power is sufficient in the battery. The presentation is blinking when the battery capacity is lowered to the battery alarm state. In addition, presentation "Out of zone" is turned off when the apparatus is in the service area where the radio wave can be received. The display is turned on when the telephone set is out of the service zone, namely, in any area where the radio wave cannot be received. In an upper portion of the display 4, there is disposed a display 3 to present a dial number in the operation state.

The telephone device further includes audio signal transducers in the form of a transmitter or microphone 1 and a receiver 2.

Figure 2A:
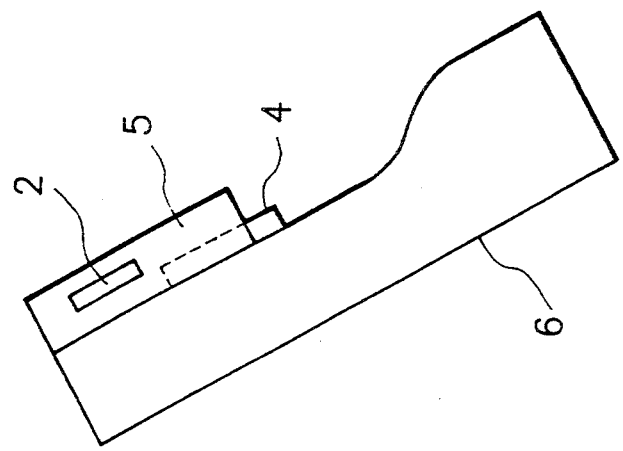
FIGS. 2A and 2B are diagrams showing side views of the portable telephone set in the embodiment in accordance with the present invention.
Figure 2B:
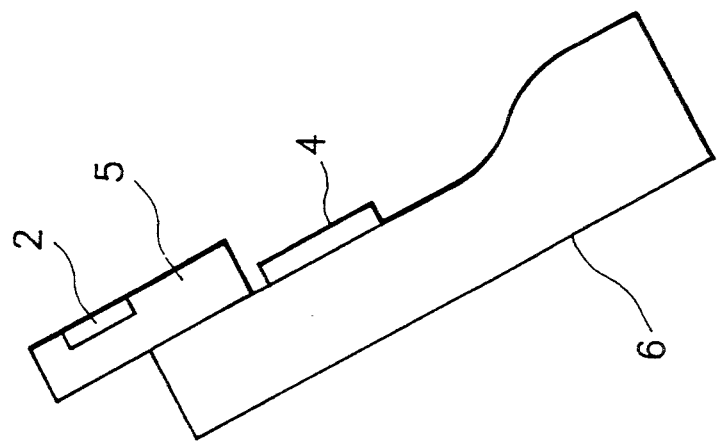

FIGS. 2A and 2B are side views respectively showing the operation and storage states of the telephone set, which correspond to FIGS. 1A and 1B, respectively. As can be seen from these diagrams, the apparatus is formed in a movable structure using a sliding action. When the apparatus is employed for communications, a housing section or casing for receiver unit 5, including the receiver 2, is moved upward relative to a housing section or casing for main body 6 of the apparatus as shown in FIG. 2A. Namely, the displays 3 and 4 are entirely disposed to the external space and hence the front surface thereof can be monitored by the user. On the other hand, in the wait state in which the apparatus is powered to await a terminating call from a call sender, the overall length of the apparatus is minimized. Namely, the receiver 2 of the receiver unit 5 is retracted as shown in FIG. 2B. In this situation, only the diplay 4 achieving the necessary function display of "Power" and "Out of zone" shown in FIGS. 1A and 1B can be seen from the user. Namely, there is concealed the display 3 accomplishing the dial display unnecessary in the state.

Figure 3:
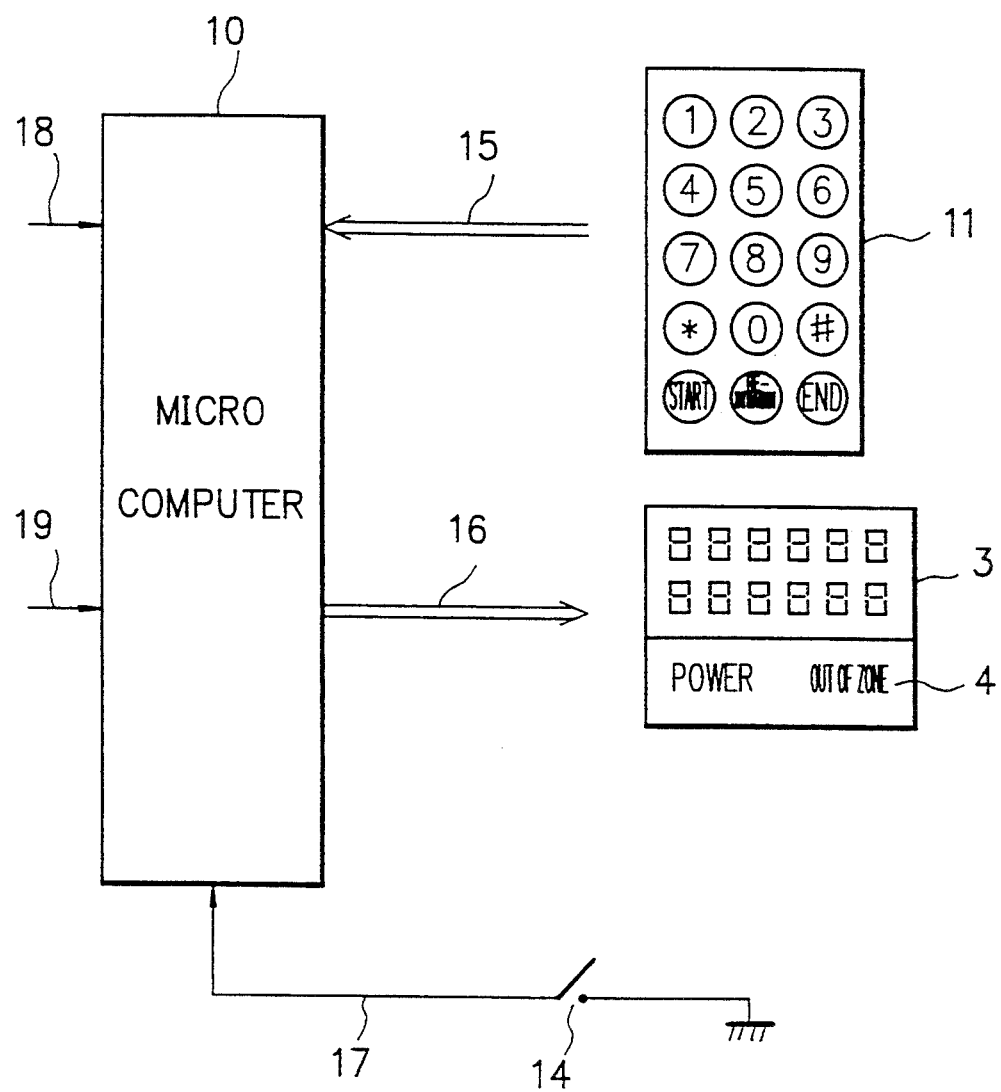
FIG. 3 is a block diagram schematically showing the constitution of the portable telephone set of the embodiment in accordance with the present invention.

FIG. 3 shows in a block diagram functions of the apparatus shown in FIGS. 1A, 1B, 2A, and 2B. In this regard, there are omitted in this diagram any constituent components not directly related to the present invention, for example, means for determining whether or not the apparatus is in a region where communications are possible. In this structure, a display control means in the form of micro computer 10 determines the operation and storage states of the apparatus depending on a signal supplied from an input signal line 17 via a micro switch 14 so as to control the input from dialing keys of a keyboard 11 and the presentation on the displays 3 and 4. That is, when the apparatus is in the operating state, a contact point of the micro switch 14 is not conductive; whereas, when the apparatus is in the wait state, the contact point is conductive. The micro computer 10 checks a logical level of the input signal 17 to determine the operation or storage state according to an H or L level thereof. When the storage state is assumed as a result of the check, the micro computer 10 initiates a display operation for only the display 4 via an output signal line 16. When the operating state is resultantly assumed, the micro computer 10 achieves a display operation for both of the display 3 and 4 via the line 16. In addition, also when an input of numeric keys is received from the keyboard 11 via an input signal line 15, the micro computer 10 carries out an display operation for the displays 3 and 4 via the output line 16.

Figure 4:
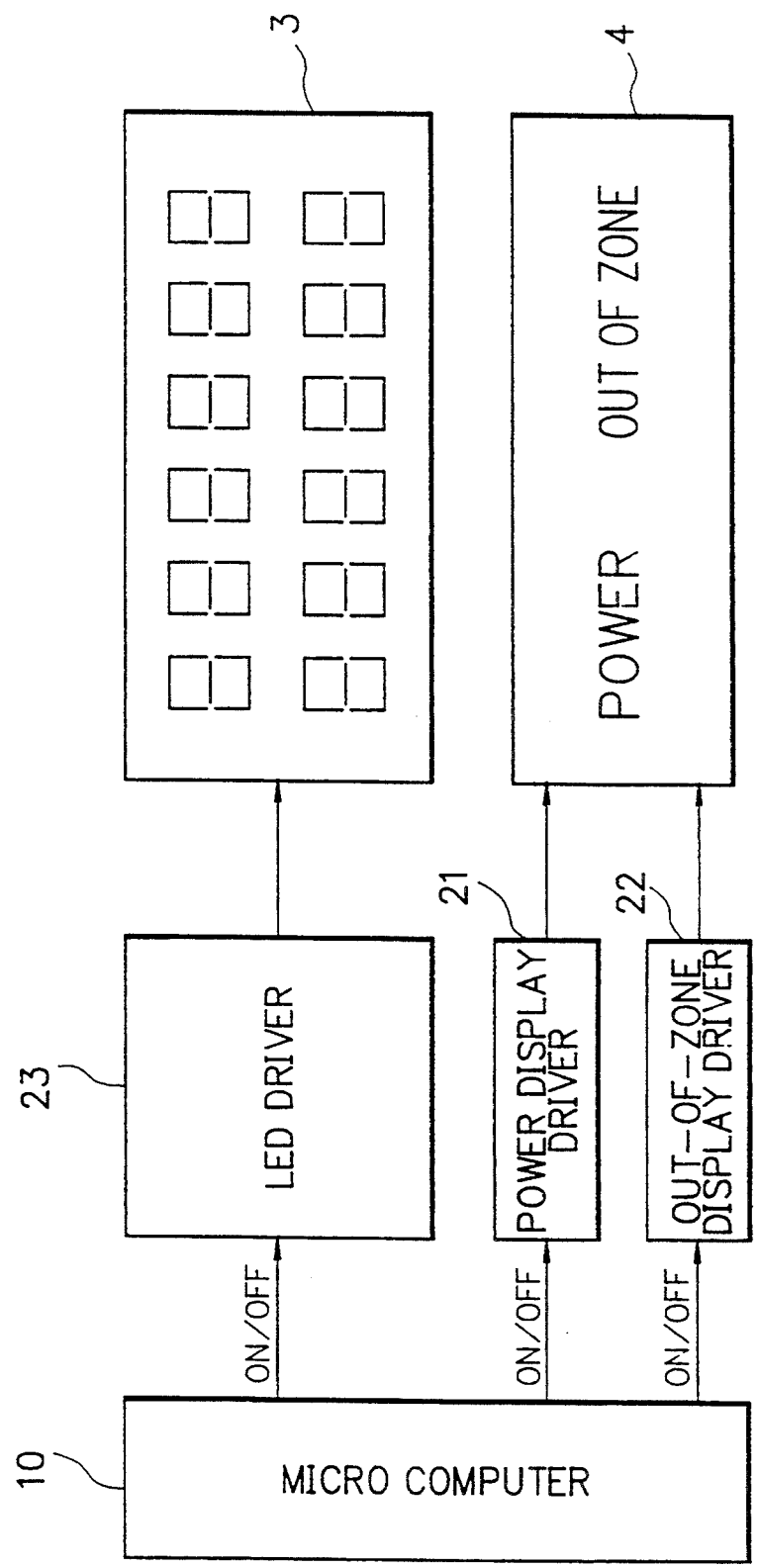
FIG. 4 is a block diagram for explaining a display driving function of the portable telephone set of the embodiment in accordance with the present invention.

FIG. 4 is a diagram for explaining a control operation of the micro computer 10 to drive the displays 3 and 4. As shown in this diagram, the micro computer 10 is connected to the display 4 via a circuit 21 to drive the display of "Power" and a circuit 22 to drive the display of "Out of zone". The driver circuit 21 activates the presentation of "Power" of the display 4, whereas the driver circuit 22 drives the presentation of "Out of zone" of the display 4. The computer 10 is further linked to the display 3 via a circuit 23 to drive light emitting diodes (LEDs). To display a dial number on the display 3, the driver circuit 23 controls the LEDs of the display 3.

Figure 5:
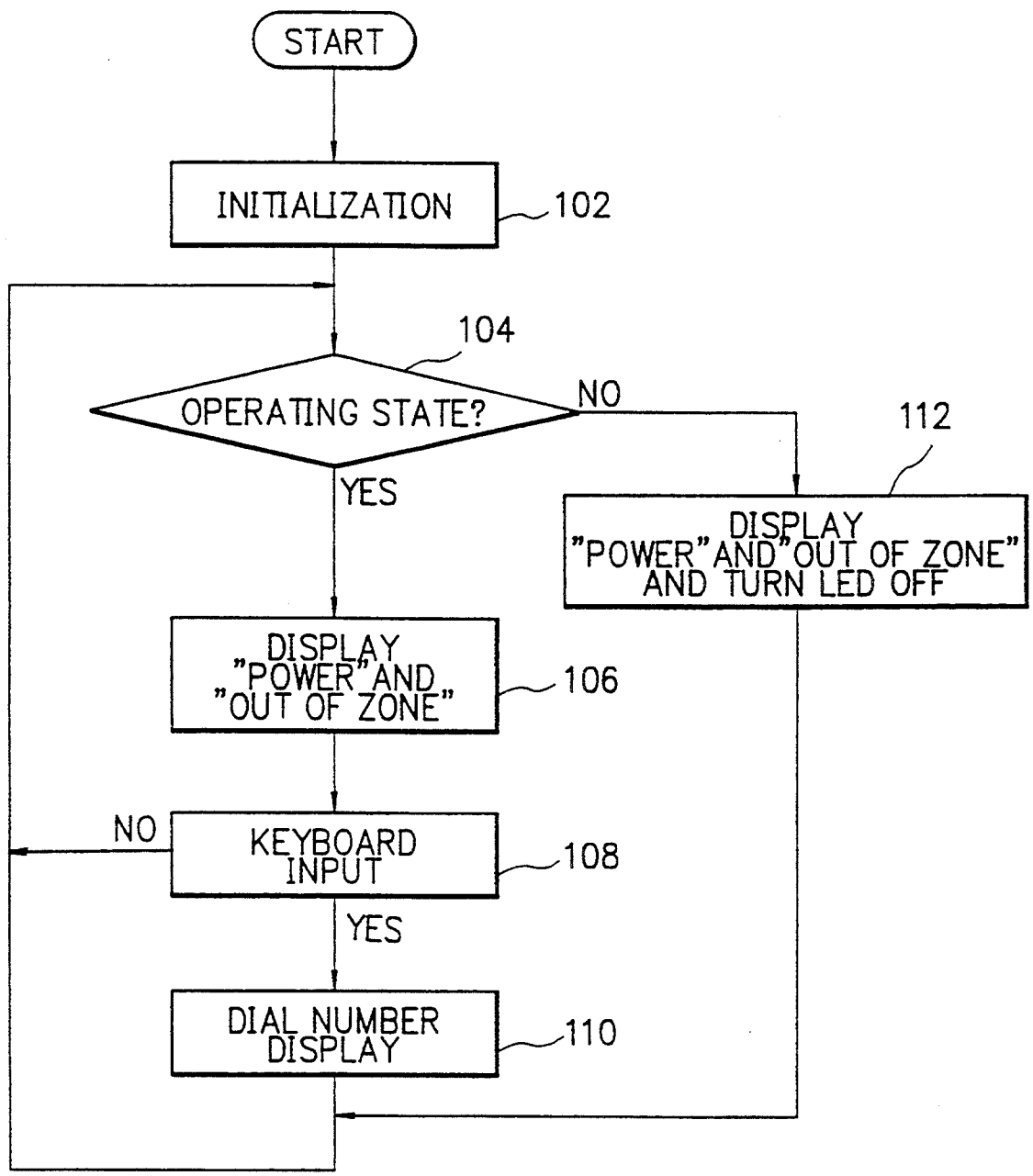
FIG. 5 is a flowchart showing the operation of the portable telephone set of the embodiment in accordance with the present invention.

Subsequently, the display operation of the apparatus will be described by reference to the flowchart of FIG. 5. First, an initial setting operation is carried out (step 102). Next, the micro computer 10 recognizes the operation or storage state of the apparatus according to the signal 17 of FIG. 3 (step 104). In the operating state, the computer 10 checks a signal 18 inputted thereto to indicate whether or not the apparatus is powered and the battery power is sufficient. Depending on the signal 18, the computer 10 decides whether or not the character "Power" is to be presented on the display 4, thereby delivering a signal reflecting the decision to the driver circuit 21. In response to the signal, the driver 21 illuminates the word "Power" when the apparatus is powered and the battery power is sufficient. In other cases, the computer 10 blinks the letters "Power". Next, the computer 10 decides, according to an out-of-zone/in-zone signal 19 supplied thereto, whether or not the characters "Out of zone" is to be presented so as to feed a resultant signal to the driver circuit 22. In response to the signal, the driving circuit 22 displays the letters "Out of zone" on the display 4 when the apparatus is out of the communication zone (step 106).

Furthermore, the computer 10 checks a signal 15 inputted thereto to determine whether or not an operation has been conducted from the keyboard 11 of FIG. 3 (step 108). If this is the case, presentation of a dial number is assumed to be required and hence a driving signal is delivered to the LED driving circuit 23. In response thereto, the circuit 23 activates the LED unit to present the dial number on the display 3 (step 110).

When the apparatus is in other than the operation state in the step 104, the computer 10 checks, like in the step 106, the signal 18 inputted thereto indicating whether or not the apparatus is powered and the battery power is sufficient. According to the signal 18, the computer determines whether or not the character "Power" is to be presented on the display 4, thereby delivering a signal obtained as a result of the decision to the driver circuit 21.

In response to the signal, the driver 21 illuminates the letters "Power" when the apparatus is being powered and the battery power is sufficient; otherwise, the computer 10 blinks the letters "Power". Next, the computer 10 decides, according to the out-of-zone/in-zone signal 19 supplied thereto, whether or not the characters "Out of zone" is to be presented so as to feed an obtained signal to the driver circuit 22. In response to the signal, the driving circuit 22 displays the letters "Out of zone" on the display 4 when the apparatus is out of the communication zone. Moreover, the computer 10 supplies the LED driving circuit 23 with a driving signal forcibly turning the LED unit off, thereby setting the LED unit of the display 3 to the off state (step 112).

In accordance with the apparatus developing the function display above, even in the wait or storage state thereof, the user can determine availability of the apparatus without setting the housing of the apparatus to the elongated state of FIG. 1A in the actual operation thereof. Furthermore, in the storage state of FIG. 1B, although the receiver 2 shown in FIG. 1A is concealed in the cabinet and hence the user cannot conduct a telephone call in this state, the apparatus in the minimized size can be conveniently stored in a pocket of a jacket or the like.

On the other hand, in the operating state in which the length of the apparatus is elongated as shown in FIG. 1A so that the distance between the transmitter 1 and the receiver 2 is similar to that between the mouth and the ear of the user. This possibly improves such characteristics of the telephone set as the quality of voice in the speech. Moreover, in the operating state, since the display area of the apparatus is enlarged and hence a dial number may possibly be presented thereon in the key-in operation.

In accordance with the present invention as described above, the telephone apparatus is configured in the following structure. Namely, there is disposed a display for presenting a dial number and functional information, the length of the housing thereof can be changed between the operation and storage states thereof such that the display area is increased or decreased respectively in the operation and storage states, and the apparatus includes a detecting circuit to detect the operation state and/or the storage state. In consequence, in the storage state, indispensable information items such as the remaining power of the battery and the in-service-area presentation are displayed. As a result, there are obtained advantageous features, for example, the size of the apparatus is reduced in the storage state and the usability thereof is improved in the operating state.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A slidably retractable portable telephone apparatus having an extended length in an operational state thereof and a retracted length in a storage state thereof, said apparatus comprising:

a communication means having a pair of audio signal transducers;

a detection means for detecting said operational state and said storage state of said telephone apparatus;

a display control means responsive to an output signal of said detection means;

a housing for accommodating therein said communication means, said detection means and said display control means;

said housing including a first casing for accommodating therein either of said audio signal transducers and a second casing for accommodating therein the other of said audio signal transducers and a second casing for accommodating therein the other of said audio signal transducers, said second casing being slidable relative to said first casing into a first position to establish said extended length of said telephone apparatus and a second position to establish said retracted length of said telephone apparatus;

said first casing having a plurality of dialing keys and a display section for displaying a current condition of said telephone apparatus and a dialed number corresponding to an operation of said dialing keys;

said second casing being configured so that in said first position, said dialing keys and said display section are both exposed to the outside, and in said second position, said second casing defines in said display section a boundary between a first display region for displaying said current condition and a second display region for displaying said dialed number and conceals said second display region while leaving said first display region and said dialing keys, as they are exposed; and said display section being controlled by said display control means so that in said operational state of said telephone apparatus said display section displays said current condition in said first display region and said dialed number in said second display region, and in said storage state of said telephone apparatus said display section stops displaying said dialed number in said second display region, while continuing to display said current condition in said first display region.

2. A slidably retractable portable telephone apparatus as claimed in claim 1, wherein said telephone apparatus is available for use within a given service zone; said telephone apparatus further comprising a power supply means as an electric power source thereof and a signal source means for giving a power indication signal representing a current state of said power supply means and a zone indication signal representing a current location of said telephone apparatus in relation to said service zone;

said display control means being responsive to said power indication signal and said zone indication signal; and said first display region being controlled by said display control means to display therein said current state of said power supply means and said current location of said telephone apparatus.

3. A slidably retractable portable telephone apparatus as claimed in claim 1 wherein said second display region includes a plurality of light emitting diodes; and said display control means comprises a micro computer for processing said output signal of said detection means and a set of operation signals generated by said operation of said dialing keys, and a drive circuit responsive to an output signal of said micro computer to drive said light emitting diodes to thereby display said dialed number and also to stop displaying same.

4. A slidably retractable portable telephone apparatus as claimed in claim 1, wherein said housing is vertically elongated and includes said first casing as a relatively long lower member thereof and said second casing as a relatively short upper member thereof;

said first casing comprising a keyboard section as a lower portion thereof having arranged thereon said dialing keys, and said display section as an upper portion thereof;

said display section comprising a lower part including said first display region and an upper part including said second display region; and said second casing being slidably engageable with said upper part of said display section.

5. A slidably retractable portable telephone apparatus having an extended length in an operational state thereof and a retracted length in a storage state thereof, said apparatus comprising:

a radio communication means provided with a microphone member and a speaker member;

a plurality of dialing keys;

a display section for displaying a current condition of said telephone apparatus and a dialed number corresponding to an operation of said dialing keys;

a housing including a first casing for accommodating therein said radio communication means and said microphone member and fitting thereon said dialing keys and said display section, and a second casing for accommodating therein said speaker member;

said second casing being slidable relative to said first casing into a first position to establish said extended length of said telephone apparatus and a second position to establish said retracted length of said telephone apparatus; and said second casing being configured so that in said first position said display section is exposed to the outside, and in said second position said display section defines a boundary between a first display region for displaying said current condition and a second display region for displaying said dialed number and conceals said second display region.

6. A slidably retractable portable telephone apparatus a claimed in claim 5, further comprising a detection means for detecting said operational state and said storage state of said telephone apparatus, and a display control means responsive to an output signal of said detection means; and said display section being controlled by said display control means to display said current condition in said first display region during said operational state and said storage state of said telephone apparatus, and said dialed number in said second display region during said operational state of said telephone apparatus.

* * * * *